(12) United States Patent
Pini et al.

(10) Patent No.: US 11,290,463 B2
(45) Date of Patent: Mar. 29, 2022

(54) METHOD FOR REGULATING ACCESS TO DATA CONNECTION BY AN ELECTRONIC DEVICE

(71) Applicant: Saints Group S.r.l., Forli (IT)

(72) Inventors: Gianluca Pini, Fusignano (IT); Giancarlo Giorgetti, Cazzago Brabbia (IT)

(73) Assignee: SAINTS GROUP S.R.L., Forli (IT)

( * ) Notice: Subject to any disclaimer, the term of this patent is extended or adjusted under 35 U.S.C. 154(b) by 391 days.

(21) Appl. No.: 16/468,787

(22) PCT Filed: Dec. 18, 2017

(86) PCT No.: PCT/IB2017/058056
§ 371 (c)(1),
(2) Date: Jun. 12, 2019

(87) PCT Pub. No.: WO2018/116124
PCT Pub. Date: Jun. 28, 2018

(65) Prior Publication Data
US 2020/0084214 A1    Mar. 12, 2020

(30) Foreign Application Priority Data

Dec. 19, 2016  (IT) .......................... 102016000127897
Jun. 23, 2017  (IT) .......................... 102017000070573

(51) Int. Cl.
*H04L 29/06* (2006.01)
*H04L 41/28* (2022.01)
(Continued)

(52) U.S. Cl.
CPC ............ *H04L 63/102* (2013.01); *H04L 41/28* (2013.01); *H04L 51/02* (2013.01);
(Continued)

(58) Field of Classification Search
CPC ..... H04L 41/28; H04L 51/02; H04L 63/0861; H04L 63/10; H04L 63/102; H04M 15/88; H04M 15/885; H04M 15/888
See application file for complete search history.

(56) References Cited

U.S. PATENT DOCUMENTS 8,194,581 B1   6/2012 Schroeder et al.
8,412,154 B1 * 4/2013 Leemet ............... H04M 15/705
                                                        455/406

(Continued)

OTHER PUBLICATIONS

International Search Report and Written Opinion for Corresponding International Application No. PCT/IB2017/058056 (15 Pages) (dated Feb. 20, 2018).

*Primary Examiner* — Chau Le
(74) *Attorney, Agent, or Firm* — Lucas & Mercanti, LLP

(57) ABSTRACT

A method for monitoring and limiting access to a data connection by an electronic which has means for enabling/disenabling selectively the data connection is disclosed. The method includes a) detecting the initial and final time of each access to data connection during a predetermined time interval; b) counting the overall duration of the accesses to the data connection during the predetermined time interval; and c) if the overall duration reaches a value equal to a maximum duration value pre-set before the end of the predetermined time interval, actuating the means for disenabling the data connection until the end of the predetermined time interval. The method can provide a detailed report and a check in real time, by remote access, of the accesses and durations of a web site, of the time use of installed applications on the device, telephone calls, texts and screenshots of the devices placed under control.

9 Claims, 2 Drawing Sheets

(51) Int. Cl.
*H04L 51/02* (2022.01)
*H04M 15/00* (2006.01)
*H04M 15/02* (2006.01)

(52) U.S. Cl.
CPC .......... *H04L 63/0861* (2013.01); *H04L 63/10* (2013.01); *H04M 15/885* (2013.01); *H04M 15/888* (2013.01); *H04M 15/88* (2013.01)

(56) References Cited

U.S. PATENT DOCUMENTS

| | | | |
|---|---|---|---|
| 9,191,853 B2 * | 11/2015 | Kosseifi | H04L 47/125 |
| 9,554,190 B2 * | 1/2017 | Hodges | H04N 21/44222 |
| 9,602,467 B2 * | 3/2017 | Mahadik | H04L 63/0236 |
| 2004/0003279 A1 | 1/2004 | Beilinson et al. | |
| 2008/0070609 A1 | 3/2008 | Ackley et al. | |
| 2009/0203352 A1 * | 8/2009 | Fordon | H04M 15/55 |
| | | | 455/406 |
| 2010/0058446 A1 * | 3/2010 | Thwaites | G06F 21/604 |
| | | | 726/4 |
| 2011/0185399 A1 | 7/2011 | Webber et al. | |
| 2013/0017806 A1 * | 1/2013 | Sprigg | H04W 12/084 |
| | | | 455/411 |

* cited by examiner

METHOD FOR REGULATING ACCESS TO DATA CONNECTION BY AN ELECTRONIC DEVICE

CROSS-REFERENCE TO RELATED APPLICATIONS

This application is a 371 of PCT/IB2017/058056, filed Dec. 18, 2017 which claims the benefit of Italian Patent Application No. 102016000127897, filed Dec. 19, 2016 and Italian Patent Application No. 102017000070573, filed Jun. 23, 2017.

TECHNICAL FIELD OF THE INVENTION

The present invention relates to a method implemented by means of electronic processor for regulating access to data connection by an electronic device, wherein the data connection comprises the connection to Internet network.

The method can provide to regulate the overall duration of the accesses in a determined time interval or it can allow the access to the connection exclusively during determined time slots.

The method can further provide to monitor remotely the phone book, the list of the incoming and outcoming calls, the content of sent and received messages, the geolocalization and the chronology of the visited web sites by giving details about the time spent on each single site.

BACKGROUND

The use of smartphone and pc for on-line navigation by now belongs to the daily life of children and teenager. Often, indeed such young people access on-line Applications without being controlled by parents as far as the connection duration and the proposed information nature are concerned. Online games and social networks are among the most visited web pages, whereon younger users spend most part of their days.

Nowadays, the single way the parents can adopt to monitor and manage the use of Internet by their own children is to keep them under constant control, but this results to be difficult to be implemented.

SUMMARY OF THE INVENTION

The technical problem placed and solved by the present invention is to provide a method allowing to obviate the drawbacks mentioned above with reference to the known art.

The invention relates to a programme for processor and to a corresponding method implemented thereby for regulating and controlling access to Internet network by an electronic device, for example a fixed computer or a smartphone or a tablet.

The above-mentioned problem is solved by a method according to the independent claim 1 and by a programme for processor according to the independent claim 11.

Preferred features of the present invention are set forth in the depending claims.

The method of the present invention provides to regulate the duration of the access to data network (thereamong Internet network) during a predetermined time interval, for example on a daily, weekly or monthly basis.

According to preferred embodiments, the method of the invention provides to operate in background on the operating system of the pc, tablet or smartphone, in forced manner with respect to settings of data connection, either data are transmitted by SIM or a LAN or Wi-Fi outer network connection is used.

The method of the invention is implemented by means of software which is to be installed on, or simply is run by, the electronic device thereof one wants to monitor the access to the network.

The configuration of the settings for limiting navigation data operated by the software is possible only by an administrator user, who performs a registration during the step for installing or firstly running the software. The administrator user can access in any moment to the programme section dedicated to regulate the limitations by inserting authentication credentials, indeed stored during said registration step.

The request for the authentication credentials to modify the operating parameters of the programme is necessary to avoid that the end user (ex. minor son) using the device could modify at will the control the control settings set by the administrator user (ex. parent).

Advantageously, the present invention allows the parents to perform a control and a limitation of the Internet network navigation by their children in predefined manner, not modifiable by the latter.

According to a preferred aspect of the invention, it is possible to perform such limitation selectively for each programme/software Application (more simply Application hereinafter) installed on the controlled device.

Still, rewarding mechanisms can be provided in case of honest behaviour, in which the time limit for navigating data is not reached in the pre-established time, and punishing mechanisms in case of attempts at violating the software settings by the end user.

Such mechanisms induce the end users to manage better autonomously the time assigned to them for the connection.

Another important advantage obtained by the method of the invention is to contribute effectively in solving problems linked to the excessive use of Internet, in particular the social network Applications, by minors, as well as to monitor accessing content not suitable to their age.

Moreover, the invention can implement a valid instrument to contrast gambling and similar pathologies, apart from preventing cyberbullying phenomena.

Other advantages, features and use modes of the present invention will result evident from the following detailed description of some embodiments, shown by way of example and not with limitative purposes.

BRIEF DESCRIPTION OF FIGURES

In the following description section, the enclosed Figures will be referred to, wherein.

Figure 1:
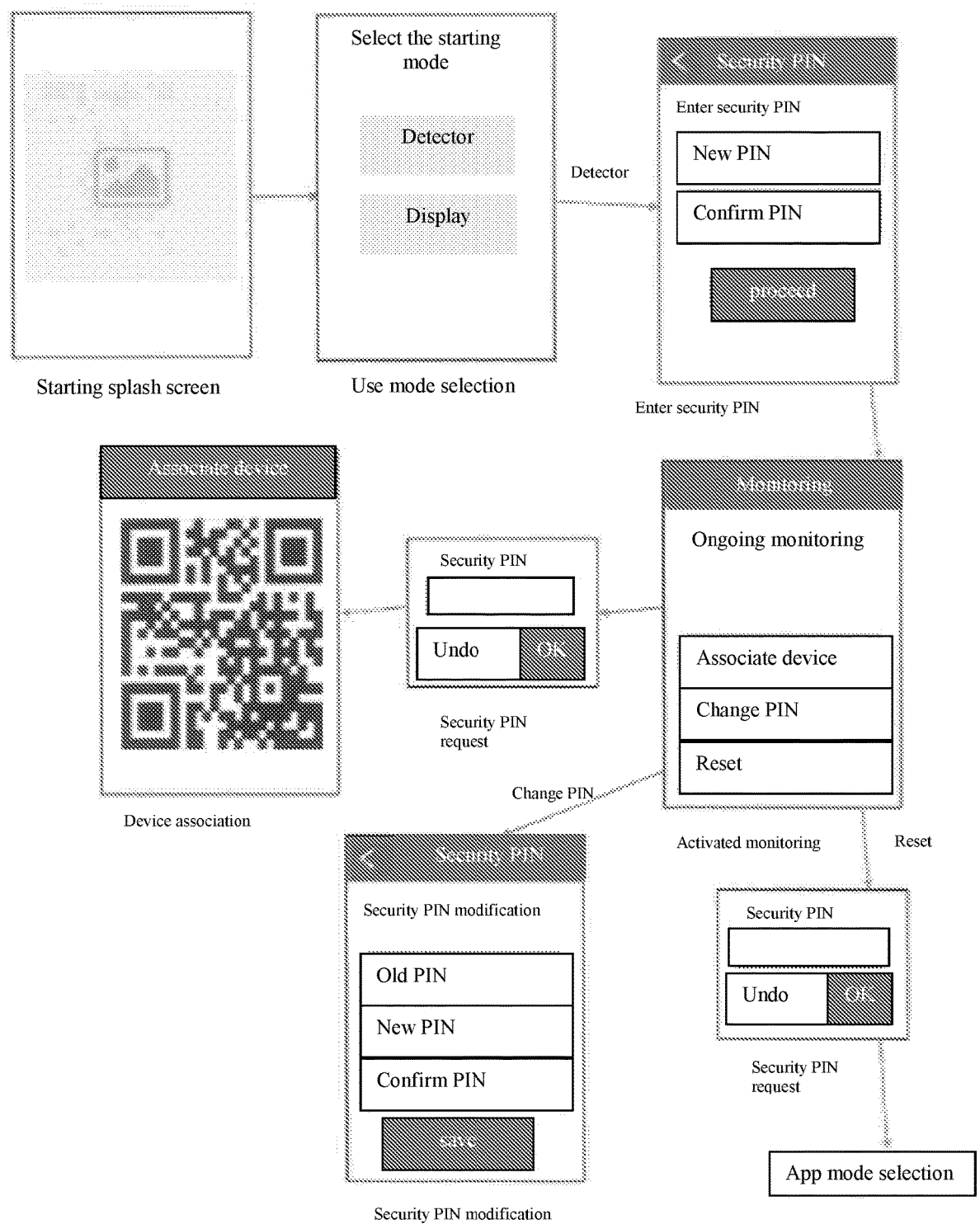
FIG. 1 shows a scheme exemplifying some steps of a first preferred embodiment of a method according to the present invention.

The above-mentioned Figures are to be meant exclusively by way of example and not for limitative purposes.

DETAILED DESCRIPTION OF PREFERRED EMBODIMENTS

The method implemented by electronic processor according to the present invention is apt to monitor and limit the access to data connection by an electronic device provided with means for enabling/disenabling selectively to the data network, according to the modes described hereinafter.

In the present discussion, the data connection designates or comprises even the connection to Internet network.

The method of the present invention is meant as suitable to be coded as a software to be installed or simply to be run on the electronic device to be controlled, preferably in the form of an Application.

The software can be discharged directly online or supported by a hardware device, such as a USB key, for connecting to the pc.

In the latter case, the method advantageously can provide the application of a mechanism for automatically locking the pc thereto the key is connected in case of forced removal of the same. In order to perform the safe removal of the key, the method preferably requests to enter access credentials to be authenticated, as it will be explained better hereinafter.

During the step for installing/firstly running the software, entering or acquiring access data of an administrator user can be provided. The access data include credentials (like username and password, preferably a double alphanumerical password) and/or biometrical data (ex. fingerprint) of the administrator user. Such access data are stored in a database or server which can be remote with respect to the controlled device.

The administrator user is the only one having the authorization level necessary to modify the data for limiting the access to data network which can be set by means of the present method, such as time limitations, maximum duration(s) of accesses, the monitored specific Application, etc. as well as the only one authorized to access data related to navigation, calls and messages stored in the above-mentioned database.

Preferably, in this preliminary step the storing of telematic addresses of the administrator user is also provided, in case the despatch of an alarm message to such administrator user is provided when one tries to modify the limitation settings by providing access data different from the stored ones, that is when the authentication fails.

When the software is installed or run for the first time it is required to set the options for locking the access to network, which can include a simple On/Off of the connection, or to set an articulated and differentiated condition of the accesses' durations for each programme/software Application (more simply Application hereinafter) installed on the electronic device.

The method implemented by the software substantially implements a time limitation of the access to data connection by the electronic device thereon the software is run.

Such limitation can be applied in block to the whole electronic device, or it can be applied selectively and independently to one or more of the Applications installed on the device itself.

According to a preferred embodiment of the method, the limitation can be implemented by means of a threshold system, so that once reached a maximum duration of the connection—set by the administrator user—in a predetermined time interval, the latter is interrupted. The limitation is set on a predetermined time interval which can be one or more hours, days or months. Even the duration of the predetermined time interval can be set by the administrator user.

The method substantially provides to detect, during the predetermined time interval, the initial and final time instant of each access to the data network. The overall duration of the accesses to network during the predetermined time interval is counted progressively. In other words, the access time counting is activated at the initial time instant of each access to the data network and it is deactivated at the final time instant of each access, to start again at the subsequent access.

If the counted access time reaches a value equal to a value of maximum duration set by the administrator user before the predetermined time interval is run out, the means for enabling/disenabling the connection is actuated to disenable the data connection until the end of the predetermined time interval. In this way, the electronic device is inhibited from the access to data network until the end of the predetermined time interval, when a new predetermined time interval starts (which can be equal or different from the previous one) and it is possible again to perform the data connection for the set maximum time duration (which can be equal or different form the previous one).

According to a preferred aspect of the present method, it is possible to count the duration of the accesses to the data connection simultaneously for one or more of the Applications installed on the device, during the same predetermined time interval. Alternatively, it is possible to adopt differentiated settings for each application as to both the predetermined time interval considered for monitoring the accesses to data connection and the allowed maximum duration of the connection, to allow the maximum customization of the limits to be imposed to the use of the specific Applications.

In this case, the method provides to detect simultaneously for each Application, during a specific predetermined time interval, the initial and final time instant of each access to the data network. The overall duration of the accesses to the network during the predetermined time interval is counted progressively for each Application according to the above-mentioned modes.

If the access time counted for an Application reaches a value equal to a maximum duration value set by the administrator user for the specific Application before the predetermined time interval is run out, the enabling/disenabling means is actuated to disenable the data connection, with reference to the considered Application, until the end of the specific predetermined time interval.

In this way, the single Application is inhibited from accessing the data network until the end of the predetermined time interval, when a new predetermined time interval starts (which can be equal or different from the previous one) and it is possible again to perform the data connection for the set maximum time duration (which can be equal or different form the previous one).

A particular case for implementing the method provides that the set maximum duration of the access to data connection is equal to the predetermined time interval, which for example can be equal to one hour a day, from 19.00 to 20.00 in the evening.

More simply, such configuration in reality implements a time slot timing of the house of the access to data network.

Even in this case, the mode for regulating the access to the data network can be applied singularly to one or more of the Applications installed on the electronic device. In other words, for each Application to be monitored a different value of the connection maximum duration and a different time interval, whereon the duration of the accesses to the connection is to be counted, can be set, to perform a control and a limitation of the access to the network independent for each one thereof.

An advantageous aspect of the method according to the present invention is to provide that, when the software is run on an electronic device, the settings related to date and time of such device cannot be modified unless entering in advance the access data of the administrator user. In this way, it is avoided that the end users of the device could get around the time limitations set to the access to data network. The most common case of using the invention could be the one in which the administrator user is a parent, the end user is a child or however a minor.

According to a preferred embodiment of the method of the invention, a rewarding mechanism can be provided and selectively activated for increasing automatically the time available for accessing the data network, if the maximum value of the granted duration is not reached within the end of the predetermined time interval.

In particular, when the overall duration of the accesses to the Internet network does not reach a value equal to the value of maximum duration within the end of said predetermined time interval, a new value of maximum duration of the access to the Interned network during a subsequent predetermined time interval is set, wherein the new value of maximum duration is higher than the previous one. Preferably, the new value is increased proportionally to the difference between the counted overall duration of the accesses to the network and the set value of maximum duration.

Correspondingly, a sanctioning mechanism can be provided, and activated automatically, for decreasing the maximum set duration, should attempts at violating the access data of the administrator user take place. Such sanctioning mechanism can be activated automatically even in case a plurality of successful authentications is detected (cloning the administrator user account).

In particular, when one attempts at accessing the software settings and the access data are not authenticated, the maximum duration of the access to the Internet network in the subsequent predetermined time interval is decreased. Preferably, the new maximum duration is reduced proportionally to the number of failed authentications.

The implemented method can be further used to perform a check, even remotely, of the navigation data of the considered electronic device.

In particular, the acquisition of information related to the data produced by the navigation by the device, such as the address of visited web pages, the date of the respective visits and/or time of using each Application, can be provided.

Still, the acquisition of information related to the presence of specific words and/or content in the text of SMS sent by means of the considered electronic device, or in the research fields by means of the browser of the same, can be provided.

Such information and acquired data are stored in a database, which can be outside or inside the considered electronic device.

The access to said database can be performed by means of any electronic device whereon the software of the invention is run, after authentication of the access data of the administrator user.

In particular, the list of words and/or content the presence thereof is to be monitored can be stored in a specific database or "Stop List".

Such list can be customized by the administrator user, by adding new words/content or by removing words/content already existing in the list.

According to preferred embodiments, it is possible obtaining a daily report of the activities performed by means of the device thereon the software of the invention is installed, by highlighting the words/content stored in the above-mentioned Stop List.

According to an additional aspect, when on the device whereon the software is run a new Application is installed, or a previously eliminated Application is re-installed, the access to data connection of such Application is inhibited, and it can be authorized only by means of the authentication of the access data of the administrator user.

Still, it is possible to provide a system for sending automatically advice of attempts of not authorized access to the software settings to a telematic address of the administrator user, for example by means of SMS/Mail/WA/Telegram.

According to an additional version of the implemented method, it is possible to apply the above-mentioned time restrictions even generically to the use of on-line or off-line Applications of games or social media.

The software application of the present invention can be developed to be compatible with IOS, Android, Windows Phone platforms and Window Operating systems. If developed by means of hardware support, it can be included in a not modifiable Usb key, which can be extracted from the pc only after authentication of the administrator user. Preferably, if removed from the pc in forced manner, it wholly locks the use thereof.

According to additional preferred embodiments of the method of the invention, it is possible to provide that the data related to the accesses to data network of one or more devices are stored in real time in a database, accessible by an administrator user by means of an additional remote device whereon the software is run.

Based upon a specific configuration of the software configurable during the first running or installing step, it is possible to implement a 'detection' or a 'display' mode of the method.

The use in 'detection' mode mainly acts in background, by acquiring automatically and storing on the database the data connection information of the specific electronic device.

The use in 'display' mode allows to access and consult the information of data connections of one or more associated electronic devices, whereon the software of the invention is run, as well as to modify the settings for limiting the duration of the connections for any associated device, and it is prerogative of the holder of the authorization level of administrator user.

Upon the first starting of the software on an electronic device, it is necessary to select the 'detection' or 'display' use mode which however could be subsequently modified by the administrator user.

Figure 2:
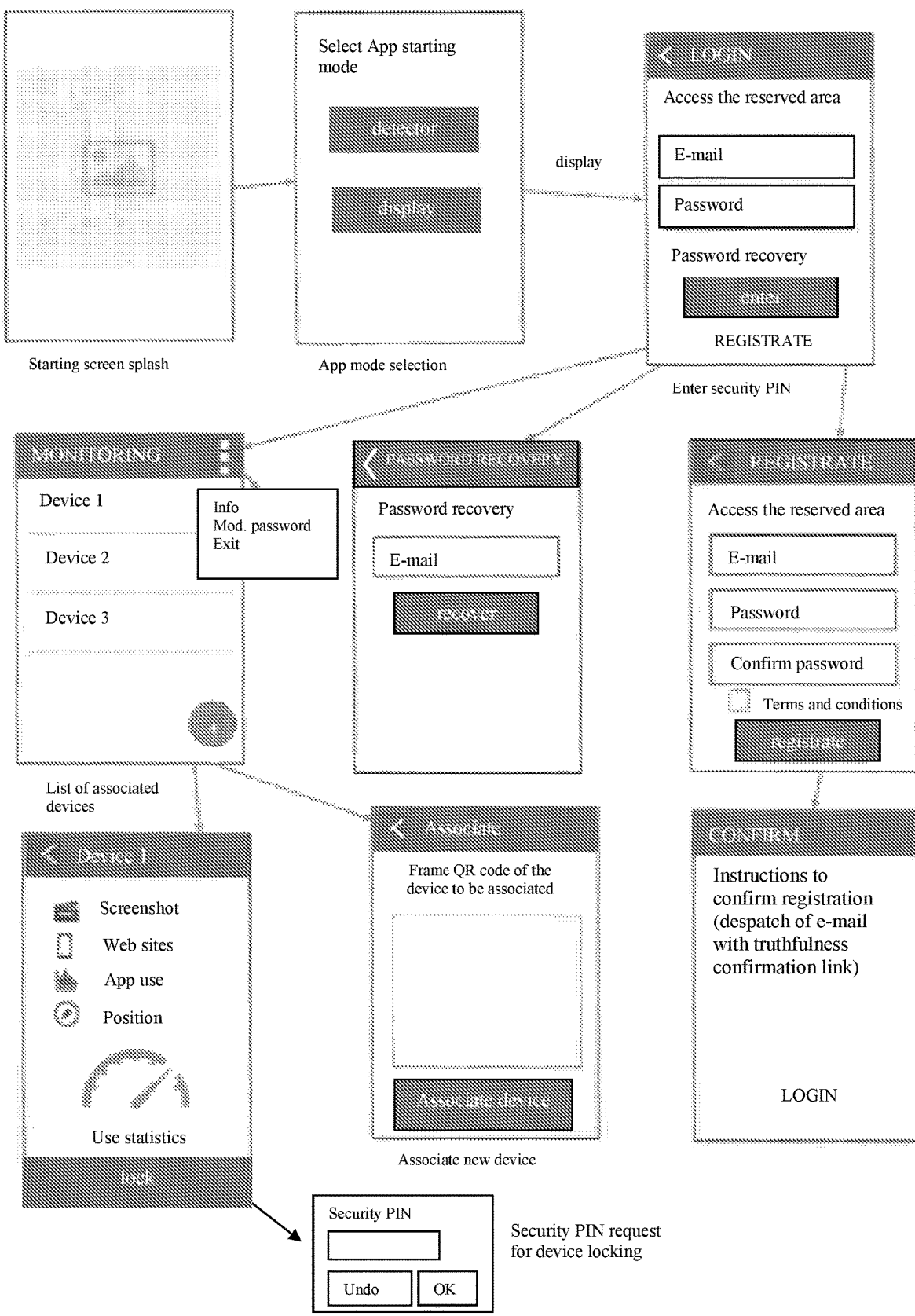
FIG. 2 shows a scheme exemplifying some steps of a second preferred embodiment of a method according to the present invention.

Preferred implementations for selecting and setting the 'detection' and 'display' modes for starting the software according to the present invention are illustrated in the enclosed FIGS. 1 and 2, respectively.

In case of selection of the 'detector' mode, it is requested to enter a PIN code, requested to perform additional subsequent procedures in order to guarantee the security thereof. Thanks to such code, secondly it is possible to modify the selected mode, or to modify the PIN itself, or still to associate the device whereon the software is run to perform the monitoring thereof even remotely.

As far as the 'display' mode is concerned, it requires an authentication in order to be activated. The administrator user can register, according to what said before, for example by entering email and password, and the access is allowed only after having verified the truthfulness of the entered data, by means of a confirmation link.

After the login it is possible to associate one or more devices to be monitored and to display the data related to the activities performed by the same.

Preferably, it is also possible to provide to share the screen of the associated devices.

In particular, for each associated device whereon the software of the invention is run it is possible to extract, display and/or verify one or more of the following:
- data of duration (ex. total, weekly, daily) and date/time of the access to data network of each Application installed on the associated device;
- screenshot or screen sharing;
- list of the addresses of the sites consulted by browser and related consulting date, even in case of navigation in hidden mode;
- list of (performed, lost, received) calls and of (sent, received) SMS;
- locking of navigation data; and
- setting of use timing.

In particular, it is possible to obtain time screenshots of the screen of the device whereon the software of the invention is installed, so as to know in a given time instant (for example at a certain time wherein the device was used by a not controlled minor) the content of the device screen.

Still, the possibility of accessing the multimedia channels of the considered device can be provided, in particular the database of photos/videos (image gallery) and/or to the cameras, to allow to check the content of the photos and/or of videos stored therein.

In particular, the method of the invention can allow to obtain a detailed report and a check in real time, through remote access, of the accesses and of the durations of the same to each web site, of the time use of the single applications installed on the device, of the list of the performed, received or lost calls, of the texts of sent and received sms as well as the static image (so-called 'Screenshot') of the devices placed under control.

The present invention has been sofar described with reference to preferred embodiments. It is to be meant that other embodiments belonging to the same inventive core may exist, as defined by the protective scope of the herebelow reported claims.

The invention claimed is:

1. A method implemented by means of an electronic processor for monitoring and limiting the access to data connection by an electronic device, which electronic device comprises modules for enabling/disenabling selectively the data connection, comprising the steps of:
    a) detecting the initial and final time instant of each access to data connection during a predetermined time interval;
    b) counting progressively the overall duration of the accesses to the data connection during said predetermined time interval, according to the following mode:
        i) counting is activated at the initial time instant of each access to data connection and
        ii) counting is deactivated at the final time instant of each access to data connection;
    c) if the overall duration of the accesses to data connection reaches a value equaling to a maximum duration value pre-set before the end of said predetermined time interval, actuating the above-mentioned enabling/disenabling modules for disenabling the data connection until the end of said predetermined time interval;
    wherein, if the overall duration of the accesses to data connection does not reach a value equal to said maximum duration value within the end of said predetermined time interval, a new maximum duration value of the access to data connection is set during a subsequent predetermined time interval, wherein said new maximum duration value is higher than the previous one proportionally to the difference between the overall duration of the accesses to the counted data connection and the pre-set maximum duration value.

2. The method according to claim 1, comprising the additional steps of:
    d) acquiring information related to data produced by the connection to data network by the device, comprising: address of the visited web pages, date/time of the respective visits and/or time of using each Application installed on the selected electronic device; and
    e) storing said information in a database.

3. The method according to claim 1, wherein said predetermined time interval has the duration of one or more hours, days, weeks or months.

4. The method according to claim 1, wherein there are provided the preliminary steps of:
    f) providing access data of an administrator user, which access data include credentials and/or biometric data; and
    g) storing said access data in a database,
wherein said predetermined maximum duration value can be set and/or modified after authentication of said access data.

5. The method according to claim 4, wherein said step f) further provides to supply telematic addresses of such administrator user,
    wherein if said access data are not authenticated, the despatch of an alarm message to the telematic addresses of such administrator user is provided.

6. The method according to claim 4, wherein, if said access data are not authenticated, the maximum duration of the access to data connection in the subsequent predetermined time interval is decreased proportionally to the number of failed authentications.

7. The method according to claim 1, performed simultaneously for one or more Applications installed on the electronic device, wherein, for each one of such Applications a respective predetermined time interval and a respective maximum duration value to the data connection is pre-set.

8. The method according to claim 1, wherein, when an Application is installed on the device, the access to data connection of such Application is inhibited and it can be authorized only by a module of authentication of access data of an administrator user.

9. The method according to claim 1, wherein a step of displaying remotely a screenshot of the electronic device screen by the administrator user is provided, after authentication of access data.

* * * * *